(12) United States Patent
Xu et al.

(10) Patent No.: US 8,600,227 B2
(45) Date of Patent: Dec. 3, 2013

(54) MULTI-FILTER ARRAY FOR A MULTI-RESOLUTION, MULTI-SPECTRAL CAMERA

(75) Inventors: Beilei Xu, Penfield, NY (US); Lalit Keshav Mestha, Fairport, NY (US); Yao Rong Wang, Webster, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 40 days.

(21) Appl. No.: 13/239,642

(22) Filed: Sep. 22, 2011

(65) Prior Publication Data

US 2013/0077958 A1    Mar. 28, 2013

(51) Int. Cl.
*G03B 11/00*    (2006.01)

(52) U.S. Cl.
USPC ............................................. 396/544

(58) Field of Classification Search
USPC ............................................. 396/544
See application file for complete search history.

(56) References Cited

U.S. PATENT DOCUMENTS

| | | | | |
|---|---|---|---|---|
| 4,325,083 | A * | 4/1982 | Rouchon et al. | 348/362 |
| 7,375,803 | B1 * | 5/2008 | Bamji | 356/4.01 |
| 7,868,936 | B2 * | 1/2011 | Ajito et al. | 348/271 |
| 2007/0206103 | A1 * | 9/2007 | Coifman et al. | 348/272 |
| 2009/0066801 | A1 * | 3/2009 | Ohta | 348/222.1 |
| 2009/0309960 | A1 * | 12/2009 | Park et al. | 348/61 |
| 2010/0140461 | A1 * | 6/2010 | Sprigle et al. | 250/226 |
| 2010/0295947 | A1 * | 11/2010 | Boulanger | 348/164 |
| 2012/0200682 | A1 * | 8/2012 | Mestha et al. | 348/61 |

OTHER PUBLICATIONS

Interference Filters, Melles Griot catalog, 12.6 Filters and Etalons, www.cvimellesgriot.com, downloaded Jan. 15, 2013.*

* cited by examiner

*Primary Examiner* — Rodney Fuller
(74) *Attorney, Agent, or Firm* — Philip E. Blair; Fleit Gibbons Gutman Bongini & Bianco P.L.

(57) ABSTRACT

A filter array for a multi-resolution multi-spectral camera system is described which not only captures 2D images at multiple wavelength bands simultaneously but also at a spatial resolution that meets the demand for spatial feature extraction. The present system optimizes filter bands that provide high image contrast at the highest possible resolution to enable spatial feature extraction and other wavelength bands at lower resolution to achieve maximum number of wavelength bands (e.g. spectral resolution) for multi-spectral analysis. After determining the required spatial resolution and number of wavelength bands for spectral analysis, multiple filters are arranged in a geometric pattern with each filter being designed to have specified wavelength and spatial resolution. Physical sizes of filters differ within each filter group. This maximizes the detector usage while optimizing the trade-off between spatial resolution and spectral resolution. Filter gaps are fixed or tuned to wavelengths of interest.

17 Claims, 8 Drawing Sheets

|          | 1050nm | 1100nm |
| 1650nm   |        |        |
|          | 1150nm | 1200nm |
| 1250nm | 1300nm | 1350nm | 1400nm |
| 1450nm | 1500nm | 1550nm | 1600nm |

*FIG. 5A*

| 1050nm | 1100nm | 1150nm | 1200nm |
| 1250nm |        |        | 1300nm |
|        | 1650nm |        |        |
| 1350nm |        |        | 1400nm |
| 1450nm | 1500nm | 1550nm | 1600nm |

MULTI-FILTER ARRAY FOR A MULTI-RESOLUTION, MULTI-SPECTRAL CAMERA

TECHNICAL FIELD

The present invention is directed to a multi-filter array for a multi-resolution multi-spectral camera and for methods for constructing such a multi-filter array.

BACKGROUND

In many applications such as vehicle occupancy detection and vein pattern extraction, there is a need to capture a 2D view of the scene with multi (hyper) spectral bands. Conventionally, a preset number of filters mounted on a wheel using a servo-control action on a camera body are used. However, the approach has limited applications when the object of interest is in motion. The time delay between various captured events can be a problem for subsequent multi-spectral analysis.

Camera systems have arisen with a honeycombed lens structure positioned along the optical axis to capture a 2D scene. FIG. 1 shows an example scene captured on a 640×512 Xenics InGaAs IR Camera with a 4×4=16 filter grid. The wavelength of each filter is fixed in ranges from 1400 nm to 1800 nm. The last four images were outside the camera's detector range. The use of a filter grid of equal size for simultaneous multi-band capture results in reduced spatial resolution depending on the number of filters. Each image in FIG. 1 is only ¼ of the camera's spatial resolution in each direction. In applications where the spatial information and features are important, e.g. face detection, vein pattern detection, textual analysis, and the like, this assembly can be quite limiting. FIG. 2 shows 13 images captured at differing wavelength bands ranging from 1050 nm (upper-left) to 1650 nm (bottom-right) each at the camera's full resolution (256× 320). The band in the middle seems brighter than others is due to the filter (1300 nm) which had higher transmission and wider bandwidth. To perform skin detection or other material detection such as fabric detection in a moving vehicle, it is desirable to capture images at a plurality of bands simultaneously. With such a multi-filter grid system, the spatial resolution of each band has to be reduced by a factor of 3 or 4 to fit 12 bands or 16 bands into the same capture. Face detection fails when the spatial resolution is reduced by more than ½ of the full camera resolution (i.e. <128×160). Hence, it is desirable to have a system that optimizes trade-offs between spatial and spectral resolution.

BRIEF SUMMARY

What is disclosed is a novel multi-filter array for a multi-resolution and multi-spectral camera system for simultaneous spectral decomposition with a spatially and spectrally optimized multi-filter array suitable for image object identification and categorization for scenes and objects under analysis. The present system employs a hyperspectral camera using a Fabry-Perot multi-filter grid each tuned to a specific wavelength to simultaneously capture different spectral planes of an image (i.e., bands comprised of narrow wavelength regions centered around the wavelength of interest). Methods are also disclosed for optimizing the filter size (i.e., spatial resolution) and wavelength bands (number, location, band width i.e., spectral resolution) to maximize the use of the imaging system. Filter sizes are determined apriori to increase spatial resolution based on a key object or a material of interest. The present spatial and wavelength optimization techniques are also applicable to a tunable/reconfigurable filter matrix. The present system optimizes one filter band that provides high image contrast at the highest possible resolution to enable face detection and other wavelength bands at lower resolution to achieve maximum number of wavelength bands (e.g. spectral resolution) for multi-spectral analysis. After determining the required spatial resolution and number of wavelength bands for spectral analysis, multiple filters are arranged in a geometric pattern with each filter being designed to have a specified spectral and spatial resolution. Physical sizes of filters differ to maximize detector usage. Filter gaps are fixed or tuned to wavelengths of interest. Controllers are not used to adjust filter gaps. Rather, all gaps are tuned apriori in the factory to the desired optimal wavelengths. There is no reconfiguration required. The present system is useful for occupancy detection in moving vehicles, in healthcare management for medical imaging and diagnosis, security systems, and in an array of other applications where a need exists to capture an image of a scene and decompose that image into its spectral bands such that objects in the image can be identified.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIGS. 5A-B show a multi-filter with multiple resolutions and multiple spectral bands constructed in accordance with the teachings thereof;

FIG. 7 shows a different configuration for visible plus IR applications; and

DETAILED DESCRIPTION

What is disclosed is a multi-filter array for a multi-resolution multi-spectral camera system which not only captures 2D images at multiple wavelength bands simultaneously but also at a spatial resolution that meets the demand for spatial feature extraction Non-Limiting Definitions A "target object" refers to an object which is intended to be analyzed for its spatial characteristics and spectral composition. A target object can comprise of a target material and target spatial characteristics. A "target material of interest" refers to a material which is intended to be analyzed for its spectral composition. Any object can comprise of a target material such as, fabric, skin, to name a few.

A "geometric pattern" refers to any geometric shape having either a fixed or variable size. Any geometric shape which filters can be arranged in accordance with the teachings hereof is intended to fall within the scope of the appended claims.

A "spatial resolution" refers to the number of pixels in an image. A higher spatial resolution means more pixels. In general, the spatial resolution is chosen to meet the demand for spatial feature extraction such as, face detection, vein pattern extraction, or textual analysis.

"Spatial characteristics" of a target material refers to information determined by an analysis of pixels of the target material. Spatial characteristics correspond to edges, lines, and texture and provides high image contrast at the highest possible resolution to enable face detection.

"Spectral characteristics" of a target material refers to the spectral composition of the target material.

A "Fabry-Perot Multi-Filter Grid" is a grid of Fabry-Perot filters with each filter transmitting a desired wavelength band and rejecting wavelengths outside that band. Embodiments of Fabry-Perot filters are shown in: "Method For Classifying A Pixel Of A Hyperspectral Image In A Remote Sensing Application", U.S. patent application Ser. No. 13/023,310, by Mestha et al., which is incorporated herein in its entirety by reference.

Figure 4A:
FIGS. 4A-B show skin-classification with 4 bands (4A) and 13 bands (4B), respectively.
Figure 4B:

As discussed in the background section hereof, it is realized that the spatial features in all 13 bands are essentially the same, i.e. spatial feature extraction such as the face-detection only has to be carried out using one of the bands. In other words, if the system has at least one band at a desired spatial resolution for spatial feature extraction then other bands can have much lower spatial resolutions since their purpose is to provide the spectral resolution, not spatial information. Not all image content will have the same image contrast at each band because the spectral responses of different materials at different wavelengths can be very different. In occupancy detection, because the scene was placed behind a windshield, the transmittance of the windshield results in images having higher image contrast at higher wavelength bands. For effective spatial feature extraction, it is preferred to access the band that provides high image contrast. In general, the spatial resolution is chosen to meet the demand for spatial feature extraction such as face detection, vein pattern extraction or textual analysis. The advantage of multi-spectral imaging over traditional single band approach is its capability to identify material rather than rely solely on spatial features. Hence, it is desirable to increase the number of spectral bands, which in general produces better identification of material. For example, comparing the skin classification results shown at FIG. 4A (4 optimized band) and at FIG. 4B (all 13 bands), it is clearly seen that the image of FIG. 4B has better classification of skin vs. non-skin. In reality, the number of bands is often constrained by the acquisition time for sequential capture or spatial resolution for simultaneous capture.

Figure 1:
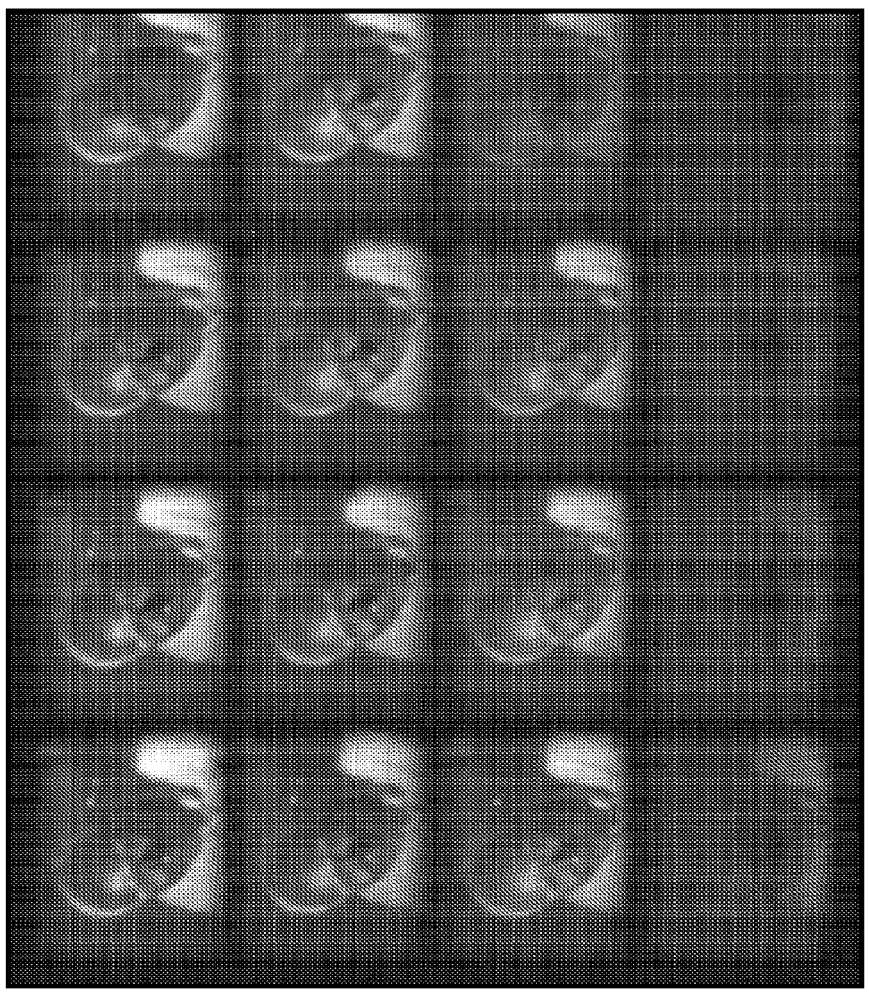
FIG. 1 is a scene captured using a 640×512 Xenics InGaAs IR Camera with 16 filters with the last four images are outside the detector range of the camera.
Figure 2:
FIG. 2 shows 13 images captured at 13 wavelength bands from 1050 nm to 1650 nm each at the camera's full resolution.
Figure 3:
FIG. 3 shows face detection using bottom-right band from FIG. 2 at half the camera's full resolution.

As shown in FIGS. 3 and 4, either method alone can often result in false positives. In many applications, it is very important to be able to manage the false alarm rate. For example, in HOV/HOT, a frequent pull-over off non-violators not only annoys travelers on the road, but also adds additional work to policemen. Hence, it is desirable to combine the results from both approaches in order to reduce the false positive rate. That is, it is desirable to not only extract spatial features but also identify material types based on spectral analysis. In the present imaging system, instead of sacrificing one for the other (i.e. spatial for spectral or vice versa), it optimizes the trade-off between the two. For example, the configurations shown in FIG. 5 give the required spatial resolution for face detection and still provide 13 spectral bands (i.e. 1050 nm, 1100 nm, 1150 nm, 1200 nm, 1250 nm, 1300 nm, 1350 nm, 1400 nm, 1450 nm, 1500 nm, 1550 nm, 1600 nm, 1650 nm) for better material (e.g., skin) identification. It is noted that the spectral analysis can be performed on the higher spatial resolution with up-sampling of the low resolution images or at the lower resolution by down-sampling of the high resolution image. In real applications, image registration is required among the bands to compensate for any imaging defects due to lens design or filter design. Once the number of filter bands is determined for the imaging system, which number of bands can then be selected based on some optimization process. In applications that don't require the total number of bands in the system, the images from several sub-bands can be integrated to form a broad band image to improve image contrast. For example, if the 4 bands (FIG. 5A) are in sequence from 1050 nm, 1100 nm, 1150 nm to 1200 nm, they can be integrated to form a single image covering the spectral range from 1050 nm to 1200 nm.

Figure 6:
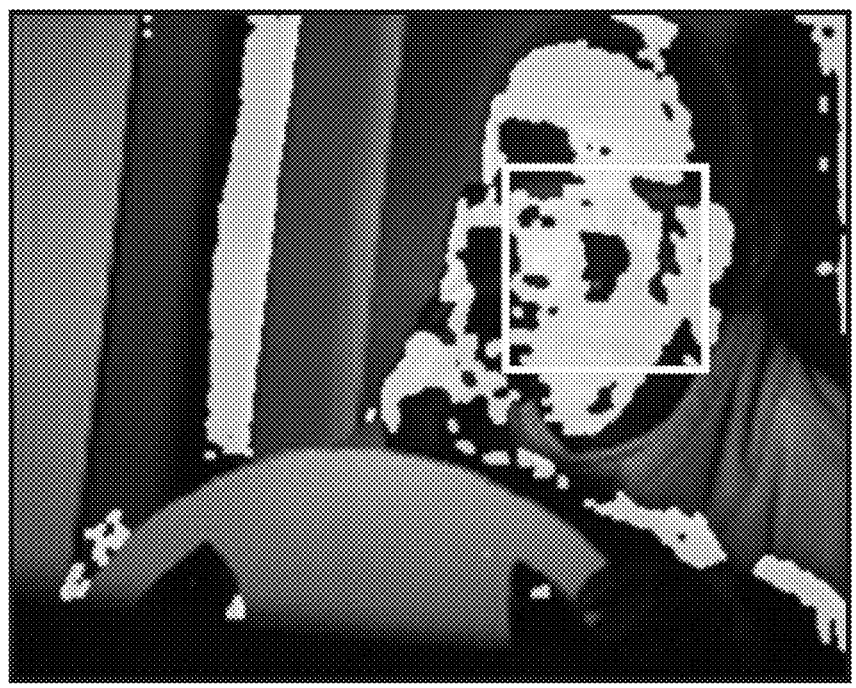
FIG. 6 shows an identified face overlapped with skin detection.
Figure 7:
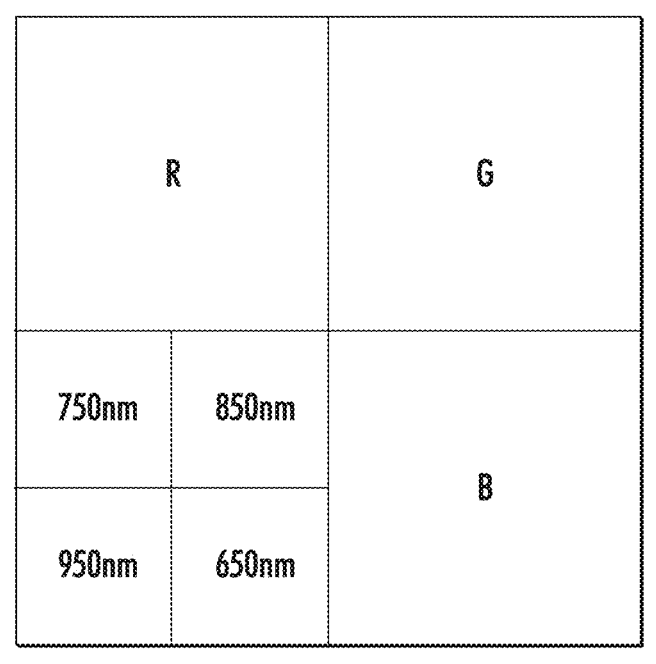

As shown in FIG. 6, with the combination of face detection and skin detection, the false positives shown in the surrounding areas can be easily eliminated. Although the number of wavelength bands can be reduced from 13 with various wavelength optimization techniques, the teachings hereof maximize the spatial resolution under the constrain of the number of wavelength bands. The high resolution band isn't restricted to a single band. Multiple bands can possess high spatial resolution as well for a specific application. For example, when IR imaging is added with visual images (RGB), the RGB channels can all have high spatial resolution, while the bands in the IR range can have low resolution as shown in FIG. 7. FIG. 5B shows an embodiment of a multi-filter array having a physically larger filter substantially centered about smaller sized filters in the geometric pattern.

Example Flow Diagram

Figure 8:
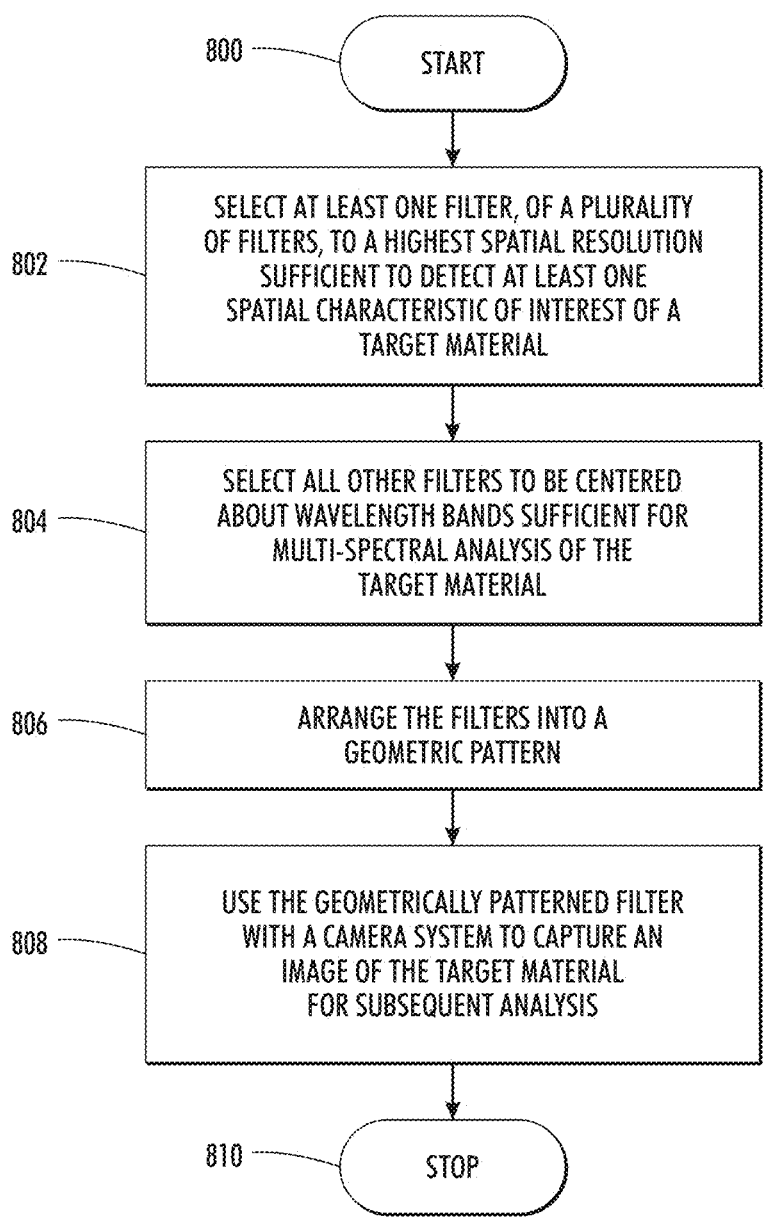
FIG. 8 is a flow diagram of one example embodiment of the present method for constructing a multi-filter array for a multi-resolution multi-spectral camera system.

Reference is now being made to the flow diagram of FIG. 8 which illustrates one example embodiment of the present method for constructing a multi-filter array for a multi-resolution multi-spectral camera system. Flow processing begins at step 800 and immediately proceeds to step 902.

At step 802, select at least one filter, of a plurality of filters, to a highest spatial resolution sufficient to detect at least one spatial characteristic of interest of a target object such as face or vein pattern. At least one of the tuned highest spatial resolution filters is physically larger than other filters.

At step 804, select all other filters to be centered about wavelength bands sufficient for multi-spectral analysis of the target material. The wavelength bands can be any portion of a range from a visible band to a long wave infrared band or any combination of visible band, near infrared, short wave infrared, mid infrared, and a long wave infrared band. The filters can be a Fabry-Perot filter for simultaneous multi-band capture of different spectral planes, or a filter wheel for non-simultaneous multi-band capture of different spectral planes.

At step 806, arrange the filters into a geometrical pattern.

At step 808, use the geometrically patterned filter in a camera system to capture an image of the target material for subsequent analysis. Thereafter, further processing stops.

It should be appreciated that the flow diagrams hereof are illustrative. One or more of the operative steps illustrated in any of the flow diagrams may be performed in a differing order.

One or more aspects of the methods described herein are intended to be incorporated in an article of manufacture. It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the appended claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A geometrically patterned multi-filter array for a multi-resolution multi-spectral camera system, the multi-filter array comprising:
   an image sensor in a camera with a full spatial resolution;
   a first high spatial resolution filter providing high image contrast for enabling a detection of at least one spatial characteristic of interest of a target object on a first portion of said image sensor at a high spatial resolution being less than said full spatial resolution; and
   a plurality of second filters with each being centered about wavelength bands which enable multi-spectral analysis of a material comprising said target object, said first filter being physically larger than any of said second filters, said first filter and said plurality of second filters being arranged in a geometric pattern, said geometrically patterned multi-filter array effectuating simultaneous multi-band capture of different wavelengths of an electromagnetic spectrum of said target object on a second portion of said image sensor at low spatial resolutions, wherein a sum of all said low spatial resolutions being equal to said high spatial resolution being subtracted from said full spatial resolution.

2. The multi-filter array of claim 1, wherein any of said filters comprise a Fabry-Perot filter.

3. The multi-filter array of claim 1, wherein said wavelength bands comprise any portion of a visible to a long wave infrared band.

4. The multi-filter array of claim 1, wherein said geometric pattern is arranged such that said first filter is substantially centered about said plurality of second filters.

5. The multi-filter array of claim 1, wherein said first filter comprises a plurality of first filters, a total number of said larger filters being less than a total number of said second filters.

6. The multi-filter array of claim 5, wherein said plurality of larger filters all a same size.

7. The multi-filter array of claim 6, wherein said geometric pattern comprises the pattern of FIG. 7.

8. The multi-filter array of claim 1, wherein said multi-filter array effectuating simultaneous multi-band capture of different wavelengths of the electromagnetic spectrum of said target object are all infrared wavelengths.

9. A method for constructing a geometrically patterned multi-filter array for a multi-resolution multi-spectral camera system, the method comprising:
   selecting a first high spatial resolution filter providing high image contrast for enabling a detection with an image sensor of at least one spatial characteristic of interest of a target object on a first portion of said image sensor at a high spatial resolution being less than a full spatial resolution of said sensor;
   selecting a plurality of second filters centered about wavelength bands sufficient for multi-spectral analysis of a material of said target object, said first filter being physically larger than any of said second filters;
   arranging said first filter and said plurality of second filters into a geometrical pattern; and
   using said geometrically patterned multi-filter in a multi-resolution, multi-spectral camera system for simultaneous multi-band capture of different wavelengths of an electromagnetic spectrum of said target object on a second portion of said image sensor at low spatial resolutions, wherein a sum of said low spatial resolutions being equal to said high spatial resolution being subtracted from said full spatial resolution.

10. The method of claim 9, wherein any of said filters comprise a Fabry-Perot filter.

11. The method of claim 9, wherein said wavelength bands comprises any portion of a range from a visible band to a long wave infrared band.

12. The method of claim 9, wherein said geometric pattern is arranged such that said first filter is substantially centered about said plurality of second filters.

13. The method of claim 9, wherein said first filter comprises a plurality of first filters, a total number of said first filters being less than a total number of said second filters.

14. The method of claim 13, wherein said plurality of first filters all a same size.

15. The method of claim 14, wherein said geometric pattern comprises the pattern of FIG. 7.

16. The method of claim 9, wherein said multi-filter array effectuating simultaneous multi-band capture of different wavelengths of the electromagnetic spectrum of said target object are all infrared wavelengths.

17. A geometrically patterned multi-filter array for a multi-resolution multi-spectral camera system, the multi-filter array comprising:
   an image sensor in a camera with a full spatial resolution;
   a first high spatial resolution filter providing high image contrast for enabling a detection of at least one spatial characteristic of interest of a target object on a first portion of said image sensor at a high spatial resolution being approximately 25 percent of said full spatial resolution and in a red wavelength;
   a second high spatial resolution filter providing high image contrast for enabling a detection of at least one spatial characteristic of interest of a target object on a second portion of said image sensor at the high spatial resolution being approximately 25 percent of said full spatial resolution and in a green wavelength;
   a third high spatial resolution filter providing high image contrast for enabling the detection of at least one spatial characteristic of interest of a target object on a third portion of said image sensor at the high spatial resolution being approximately 25 percent of said full spatial resolution and in a blue wavelength; and
   a plurality of lower spatial resolution filters with each being centered about wavelength bands which enable multi-spectral analysis of a material comprising said target object, said first filter, said second filter, said third filter and said plurality of lower spatial resolution filters being arranged in a geometric pattern, said geometrically patterned multi-filter array effectuating simultaneous multi-band capture of different wavelengths of an electromagnetic spectrum of said target object on a fourth portion of said image sensor at low spatial resolutions, wherein a sum of said low spatial resolutions being equal to approximately 25 percent of said full spatial resolution.

* * * * *